United States Patent [19]

Stickney

[11] Patent Number: 5,337,343
[45] Date of Patent: Aug. 9, 1994

[54] HEADSET BRIDGE FOR OPERATING MULTIPLE COMMUNICATION DEVICES

[75] Inventor: David R. Stickney, Lewstown, Ohio
[73] Assignee: United Telephone Company of Ohio, Mansfield, Ohio
[21] Appl. No.: 877,526
[22] Filed: May 10, 1992
[51] Int. Cl.$^5$ .................... H04M 11/04; H04M 1/00; H04M 3/00
[52] U.S. Cl. ........................ 379/45; 379/49; 379/308; 379/438
[58] Field of Search ............. 379/45, 37, 49, 319, 379/308, 320, 321, 438, 441, 442, 430, 487, 399, 422, 423; 439/638, 676

[56] References Cited

U.S. PATENT DOCUMENTS

| | | | |
|---|---|---|---|
| 4,049,925 | 9/1977 | Laing et al. | 179/99 |
| 4,052,569 | 10/1977 | Pirnie, III | 379/45 |
| 4,179,590 | 12/1979 | Snow | 179/156 |
| 4,517,413 | 5/1985 | Pavitt, Jr. | 179/81 |
| 4,689,814 | 8/1987 | Warner, II | 379/442 |
| 4,722,077 | 1/1988 | Jachmann et al. | 369/25 |
| 4,893,325 | 1/1990 | Pankonen et al. | 379/45 |
| 4,893,331 | 1/1990 | Horiuchi et al. | 379/93 |
| 4,896,345 | 1/1990 | Thorne | 379/67 |

OTHER PUBLICATIONS

"Integrated PSAP (Public Safety Answering Point) Equipment" Attendant Operating Instructions, Rockwell International, Issue 1, Feb., 1988.

Primary Examiner—Curtis Kuntz
Assistant Examiner—Jason Chan
Attorney, Agent, or Firm—Harley R. Ball; Michael J. Setter

[57] ABSTRACT

The present invention provides a telephonic headset bridging apparatus having relay based circuitry for automatically or manually switching a single telephonic headset to operate and monitor a plurality of communication apparatuses. The bridging apparatus includes isolated circuits so that the various communication devices which are to be operated, using the headset bridging apparatus, are not able to communicate with each other. The invention is particularly designed for use in a police station to use a single telephonic headset to monitor a plurality of communication apparatuses that includes an integrated Public Safety Answering Equipment (PSAP), a telephone, and, in a more particular embodiment, a radio. A recorder connection is also provided in the bridging device.

7 Claims, 3 Drawing Sheets

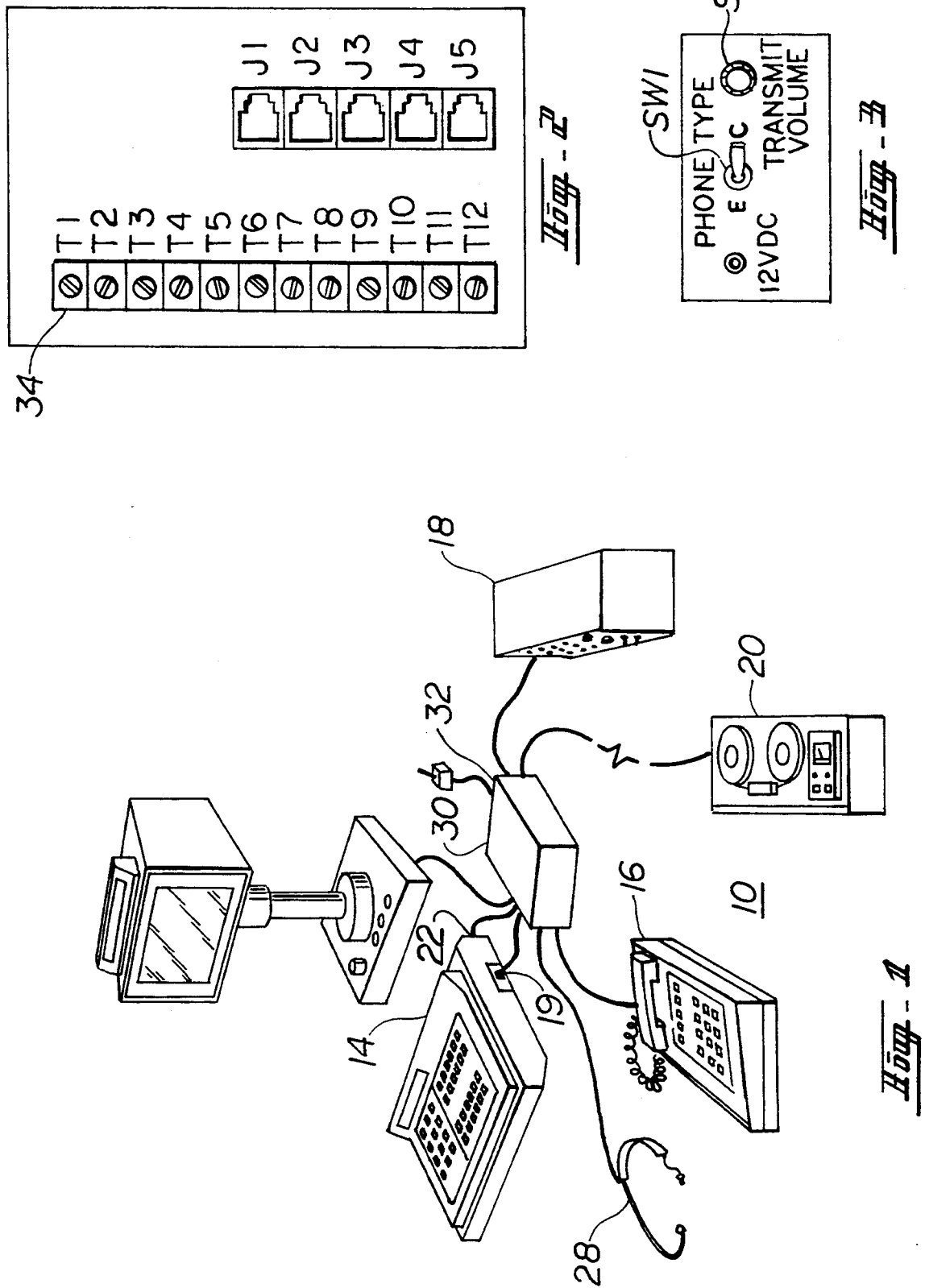

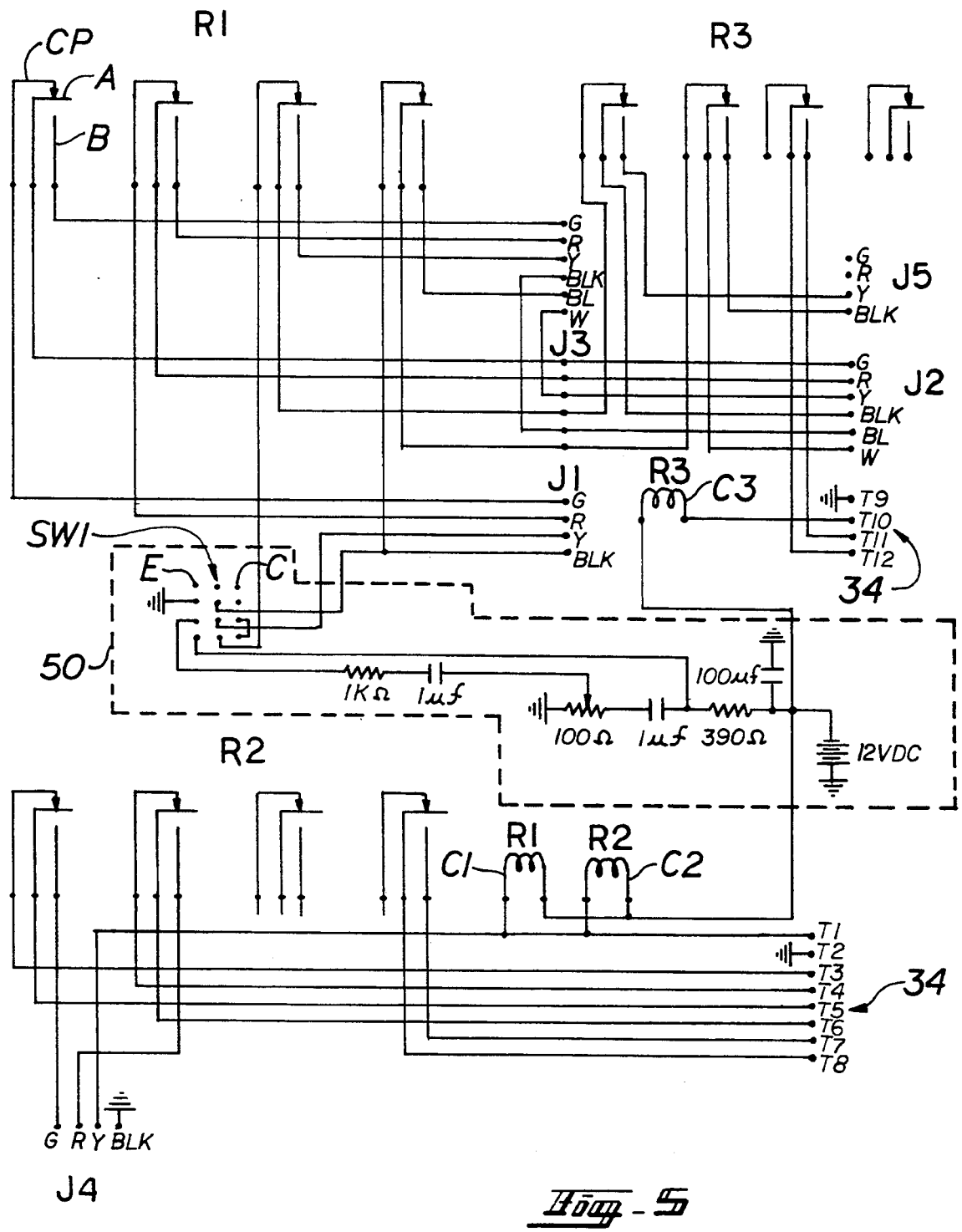

HEADSET BRIDGE FOR OPERATING MULTIPLE COMMUNICATION DEVICES

BACKGROUND OF THE INVENTION

1. Field of the Invention

This invention relates to telephonic devices and particularly to a bridging device for using a single telephonic headset to monitor and operate a plurality of communication apparatuses.

2. Description of Related Art

Modern offices make use of various communication devices such as telephones and radios or other devices that can be connected to telephones or telephone systems. One particular arrangement can be found in police stations that use telephones, radios, and specialized telephone systems for emergency telephone calls through what has become known as 911. Telephone calls on 911 are answered using what is referred to as integrated Public Safety Answering Point (PSAP) equipment. Recorders, used to record emergency and various other calls, are also connected into the telephone systems. For the purpose of this patent the interconnected devices will be referred to as communication and telephonic apparatuses.

A problem that occurs, particularly at police stations, relates to simultaneously operating different communicative telephonic devices such as the station's telephones, PSAP system, and the police radio by a single operator. To date different headsets and/or handsets would have to be used to communicate over each of these three devices. At times this has been found to be confusing, annoying, and difficult to operate particularly for single operator installations. For the purposes of this patent application, consistent with the conventional use of the terms and due to similarity of operation, the terms handset and headset are understood to be interchangeable unless otherwise stated.

SUMMARY OF THE INVENTION

The present invention provides a telephonic headset bridging apparatus for using a single telephonic headset to operate a plurality of communication apparatuses. The bridging apparatus includes isolated circuits so that the various communication devices which are to be operated, using the headset bridging apparatus, are not able to communicate with each other. The bridging apparatus provides relay based circuitry for automatically or manually switching the headset to monitor and operate the different communication devices. The relays are activated to connect one of the communication devices to the headset by a manually or an automatically activated closure signal. The preferred embodiment of the invention provides a conversion circuit for accommodating either carbon based communication transmitters or electronic type communication transmitters. One particular form of the preferred embodiment provides a bridging device for using a single telephonic headset to monitor a plurality of communication apparatuses that includes an integrated Public Safety Answering Equipment (PSAP), a telephone, and, in a more particular embodiment, a radio. A recorder connection is also provided in the bridging device.

ADVANTAGES

The present invention provides a reliable flexible system for simultaneously operating different communicative telephonic devices such as the station's telephones, PSAP system, and the police radio by a single operator using a single headset. The present invention provides the advantage of using a single headset instead of several and thereby reduces or eliminates the attendant confusion, annoyance, and difficulty often encountered by one operating these various communication devices.

BRIEF DESCRIPTION OF THE DRAWING

The foregoing aspects and other features of the invention are explained in the following description, taken in connection with the accompanying drawing where:

FIG. 1 is a general perspective view illustrating communication devices connected to a telephonic headset using the bridging apparatus of the present invention.

FIG. 2 is a diagrammatic illustration of a side panel depicting a terminal strip and jacks of the bridging apparatus in FIG. 1.

FIG. 3 is a diagrammatic illustration of a side panel depicting features of the bridging apparatus in FIG. 1.

FIG. 5 is a schematic illustration of a bridging apparatus in accordance with an alternate embodiment of the present invention.

DETAILED DESCRIPTION OF THE INVENTION

Figure 4:
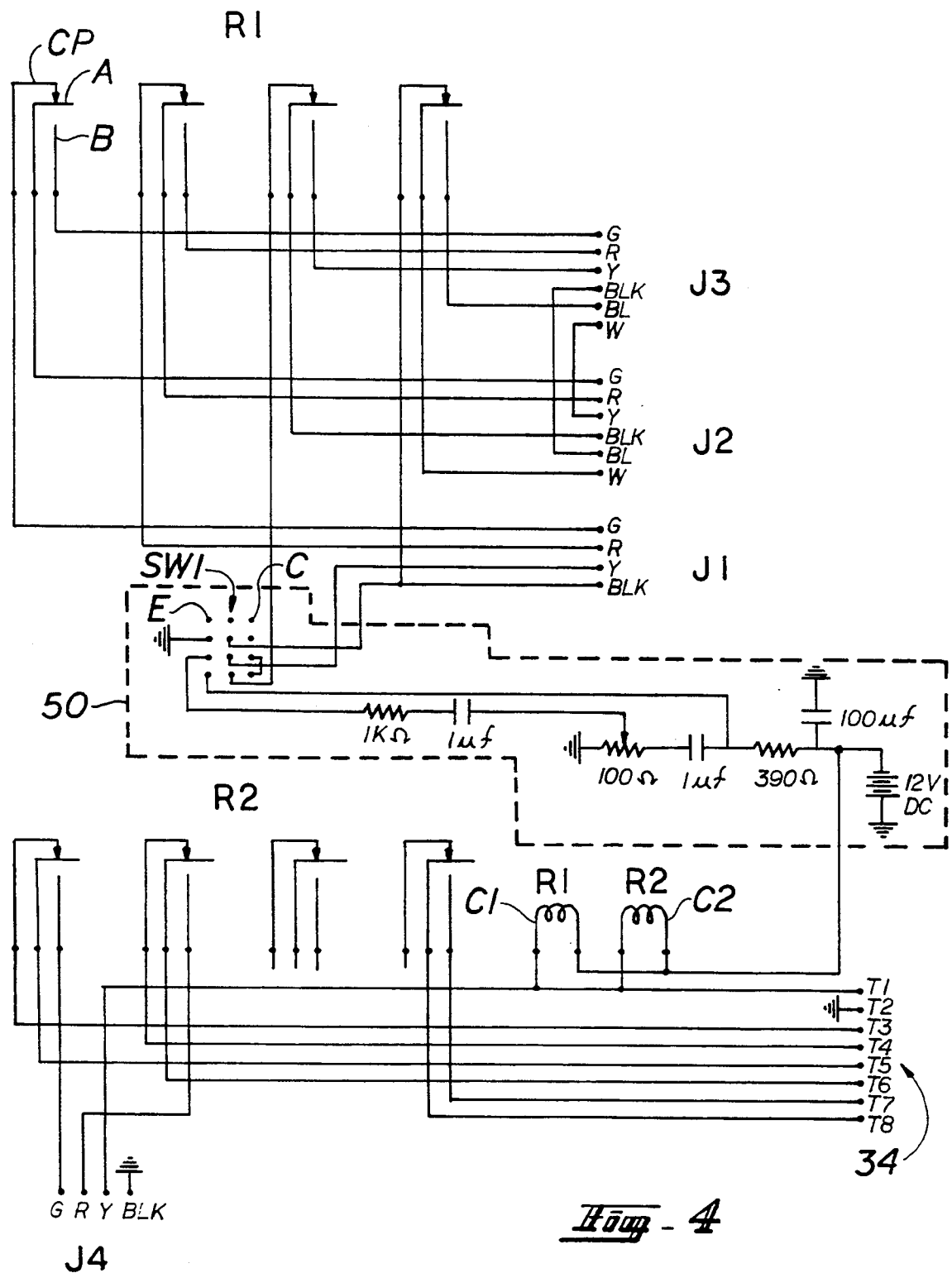
FIG. 4 is a schematic illustration of a bridging apparatus in accordance with one embodiment of the present invention.

Illustrated in FIG. 1 is police station communications system generally indicated at 10 having a plurality of communication apparatuses that typically includes an integrated Public Safety Answering Equipment (PSAP) 14, a telephone 16 (may be a multi-line phone), and a police radio 18. The present invention also provides for a recording device 20 used to record from the PSAP 14 and the telephone 16. One typical PSAP, referred to as an Integrated PSAP or IPSAP, illustrated in FIG. 1, is made by the Rockwell International Corporation and described in Rockwell's "Attendant Operating Instructions", document 500-583-481, Issue 1, published February 1988, and incorporated herein by reference. The Rockwell IPSAP has a PSAP recorder output jack 22 on its side.

A telephone headset 28 is connected to a telephone headset bridging apparatus 30 which is also connected to (PSAP) 14 by way of a PSAP handset jack 19, telephone 16 by way of its telephone handset jack, police radio 18 for on alternative embodiment, and recording device 20. The telephone headset bridging apparatus 30 is operable to allow an operator (not shown) to use telephone headset 28 to monitor and operate (PSAP) 14 or telephone 16, or as in the embodiment illustrated in FIG. 5 to alternatively transmit over police radio 18.

The telephone headset bridging apparatus 30 includes a housing 32 which used to mount circuitry within. Referring to FIG. 2, a panel of housing 32 has mounted upon it interfacing phone type jacks J1, J2, J3, J4, and an optional J5, which is used in the embodiment in FIG. 5, with which connections are made from the telephone headset bridging apparatus 30 to the headset and communication apparatuses. Though telephone type jacks have been found to be uniquely useful to make many connections in the present invention, other types of equivalent connections are contemplated including hard wiring. A terminal strip 34, that is used for connecting various optional features and a headset type switch SW1 are shown in FIG. 3 as also being mounted in housing 32. The headset switch SW1 is operable to allow the telephone headset bridging apparatus 30 to be used with either an electronic headset or a carbon headset. The switching circuitry of telephone headset bridging apparatus 30 is illustrated for two embodiments in FIGS. 4 and 5.

The present invention uses standard commonly available color coded telephone wire and jacks wherein each jack indicated in the FIGS. as J1–J5 has a male plug and a female receptacle for receiving the plug and making multiple connections between terminals in the jacks. Normally there are four or six terminals per jack. Jacks terminals are identified by the wire which they connect as illustrated in FIGS. 4 and 5 the colors are green G, red R, yellow Y, and black BLK for a four terminal jack connecting 4 wire telephone cable (either flat or round). Six wire connections are made with additional terminals and wires coded blue BL and white W.

Illustrated in FIG. 4 is the circuitry of bridging apparatus 30 for connecting a single headset between two telephonic communication devices such as the telephone and PSAP in FIG. 1. The circuit includes 4 telephone type jacks J1–J4, and two four pole double throw relays R1 and R2 with corresponding activating coils C1 and C2 used to switch corresponding sets of four double throw poles. Each set of poles includes a central pole CP depicted above a first connect position pole A and a second connect position pole B as illustrated for relay R1. The connection to the central pole CP is switchable by its corresponding coil to either of poles A and B. Note that for the sake of clarity the sets of poles and related coils of each relay are shown apart.

The bridging apparatus 30 is preferably provided with a terminal strip 34, which for the embodiment in FIG. 4 has 8 terminal connectors T1–T8, for making various connections for devices not having standard phone jack type connectors. The circuit illustrated in FIG. 5 is an alternative embodiment similar to that in FIG. 4 but is constructed for use with three communication devices, the PSAP, the telephone, and the police radio illustrated in FIG. 1 and illustrates the differences in circuitry that may be needed for embodiments other than that shown in FIG. 4 which is disclosed in greater detail herein.

Still referring to FIG. 4, an optional but very useful feature of the telephonic headset bridging apparatus 10 is a conversion circuit generally shown at 50 surrounded by a dotted line box. The switch SW1 connects the conversion circuit 50 when the switch SW1 is set in the C position to use a carbon type headset and conversion circuit 50 is disconnected when SW1 is set in the E position for electronic type headsets.

The following describes the nomenclature used to denote and explain the circuits and elements of the bridging apparatus 30. Headset jack J2 is operative to receive a conventional six terminal flat wire telephone cable connector from telephonic headset 28 in FIG. 1. Telephone jack J1 is operative to receive a conventional four terminal flat wire telephone cable connector from telephone 16 in FIG. 1 that is conventionally used to connect the telephone headset or handset to the telephone. PSAP jack J3 is operative to receive a conventional six terminal flat wire telephone cable connector from the handset jack 19 of PSAP 14 in FIG. 1. Recorder jack J4 is operative to receive a conventional four terminal flat wire telephone cable connector from the PSAP recorder output jack 22 on the backside of PSAP 14 in FIG. 1.

Referring again to FIG. 4, recorder jack J4 provides a connection for receiving both a recording signal on the G and R lines and a control signal on the Y and BLK lines which is used to trip relays R1 and R2 as shown in FIG. 4. The PSAP closure signal across Y and BLK of J4 or the momentary switch across T1 and T2 of terminal 34 seizes relays R1 and R2 which by R1 switches the J1 to J2 connection, telephone to headset, to a J3 to J2 connection, PSAP to headset. Relay R2 switches from the telephone terminal 34 connections T3 and T4 to external recorder (20 in FIG. 1.) terminal connections T5 and T6 to PSAP internal recorder connections G and R of J4 and external recorder terminal connections T5 and T6.

As can be seen in FIG. 4, J2 and headset 28 can be alternatively connected to J1 or its corresponding telephone 16 and J3 and its corresponding PSAP 14. The capability to switch connections from a single headset alternatively between two (or more) communication devices is a primary feature of the present invention. The connections are made by the appropriate relays R1 and R2. The connections may be automatically initiated by a PSAP closure signal of the type that is conventionally carried on the Y and BLK lines of the recorder jack 22 of PSAP 14. Alternatively a manually operated momentary switch is provided for across terminals T1 and T2 of the terminal strip 34 for activating relays R1 and R2.

The telephone headset cord is plugged into J1 and is connected to the headset 28 when the bridging apparatus 30 is in the idle condition. The phone type switch SW1 must be positioned to the proper type of transmitter (E) for electronic or (C) for carbon. If the telephone is electronic, then the transmitter volume must be adjusted with the transmit volume switch (SW2 in FIG. 3) while making a test call prior to using the invention.

Referring to FIG. 5, a means for using headset 28 to further communicate over the police radio 18 in FIG. 1 is provided. Since the radio has a built in speaker only the transmit function of the headset is provided for and during radio transmit operation of the present invention the receiver of the headset remains connected to the PSAP or telephone. The headset cord from the PSAP 14 is plugged into J3 and a cord from the transmitter jack of radio 18, adapted for a carbon headset, is plugged into J5. Thus J1, J3 or J5 are alternately connected to J2 for the headset 28 when the bridging apparatus 30 is seized or activated. When R3 is idle the circuit behaves the same as in FIG. 4. The bridging apparatus 30 seizes the radio transmitter by a closure signal from a momentary switch of the customers choosing wired across terminals T9 and T10 of the terminal strip 34 which trips relay R3. This action connects the transmit only connectors Y and BLK of radio transmit jack J5 to corresponding transmit connectors Y and BLK of headset jack J2 while the receive connectors G and R of J2 remains connected to corresponding receive connectors G and R of J1 or J3 depending on condition of R1 and R2 when R3 is activated. This is done so that incoming calls from the telephone or the PSAP may still be heard and the connection not interrupted, a feature particularly useful for police and other emergency type installations.

One particular feature of the present invention is that the connection between the appropriate communication device the PSAP or the telephone is initiated by a closure signal that activates a corresponding relay. Furthermore, a feature particularly useful in police station type of installations is that the lines are isolated so that the callers on the PSAP, the telephone and the police radio, when used, cannot hear either of the other callers.

Still referring to FIG. 5, terminals T11 and T12 of the terminal strip 34 are provided to allow a closure signal to be sent out to auxiliary equipment when the unit is seized for the control of auxiliary equipment. Terminals T3, T4, T5 and T6 are provided so that a recorder may switched between which ever telephonic device the operator is communicating with except with the police radio which has its own recorder.

During operation the bridging unit is seized and the headset is connected through J2 to either the telephone through J1, the PSAP through J3, or the radio transmit line through J5. Note that the radio has its own speaker through which it is conventionally monitored in the preferred embodiment. The PSAP is answered by pressing the answer button on the PSAP and relay R1 is thrown to the B position for the PSAP. This also sends a signal to throw relay R2 to switch the PSAP to be recorded to T5 and T6 which is connected. This process occurs for the embodiments in both FIGS. 4 and 5.

When the PSAP is disconnected, relay R1 is automatically thrown to position A for the telephone. This also releases relay R2 which switches the telephone voice circuit connected to T3, T4 to T5, T6 which is connected to external recorder. The relays are thrown by a control signal across Y and BLK connectors of recorder jack J4 which is received from PSAP through PSAP recorder jack 19.

Another feature of the present invention that is included in the embodiments illustrated in FIG. 4 and in FIG. 5 and that is particularly for use with the PSAP, is a means to automatically log off the PSAP when the headset is disconnected by the operator. A conventional PSAP, such as the Rockwell IPSAP illustrated herein, has a PSAP modular jack 19 that is adapted to use a conventional telephone six line cable having red and green wires for receive and yellow and blue wires for transmit. When a headset is conventionally plugged directly into the PSAP it puts a closure signal across the red line black and white wires. If the operator walks away from the unit, all the operator has to do is unplug the headset and the PSAP will automatically log him off so no calls go into the unit when there is nobody there to answer them. The telephone headset bridging apparatus of the present invention allows the PSAP to be controlled in the same manner. This is done by connecting the yellow terminal Y of headset jack J2 to the white terminal W of the PSAP jack J3 and the blue terminal BL of headset jack J2 to the black terminal BLK of the PSAP jack J3.

While the preferred embodiment of the invention has been described fully in order to explain its principles, it is understood that various modifications or alterations may be made to the preferred embodiment without departing from the scope of the invention as set forth in the appended claims.

I claim:

1. A headset bridging apparatus for connecting a single headset to a telephone and a public safety answering point (PSAP) in order to communicate through the telephone and the PSAP, the headset bridging apparatus comprising:

(a) a first switching means for switching a group of connections alternatively between two other groups of connections wherein the first switching means is activated by a first control signal;
   (b) a headset jack, a PSAP jack, and a telephone jack, wherein the jacks are telephone type jacks;
   (c) first control wiring from the first switching means operable for exterior connection and operable to activate the first switching means when the first control signal is provided to the first control wiring;
   (d) receive wiring from the first switching means to the headset jack, telephone jack, and PSAP jack operable to allow the first switching means, based on the first control signal, to switch a pair of receive wires from the headset alternatively between a pair of receive wires from the telephone and a pair of receive wires from the PSAP, when each pair of receive wires from the headset, telephone, and PSAP are connected to their respective jacks; and
   (e) firs transmit wiring from the first switching means to the headset jack, telephone jack, and PSAP jack operable to allow the first switching means, based on the first control signal, to switch a pair of transmit wires from the headset alternatively between a pair of transmit wires from the telephone and a pair of transmit wires from the PSAP, when each pair of transmit wires from the headset, telephone, and PSAP are connected to their respective jacks.

2. The headset bridging apparatus of claim 1 further comprises:

(a) a radio;
   (b) a second switching means for switching a group of connections alteratively between two other groups of connections wherein the second switching means is activated by a second control signal;
   (c) a radio connection means for accepting a connection from the radio;
   (d) second transmit wiring from the second switching means to the radio connection means, the headset jack, and the first switching means, operable to allow the second switching means, based on the second control signal, to switch the pair of transmit wires from the headset alternatively between the pair of transmit wires from the telephone and a pair of transmit wires from the radio, when each pair of transmit wires from the headset, telephone, and radio are connected to their respective jacks and radio connections means;
   (e) second control wiring from the second switching means operable for exterior connection and operable to activate the second switching means when the second control signal is provided to the wiring.

3. The headset bridging apparatus of claim 2 which further comprises a conversion circuit wires between the first switching means and the telephone jack, operable to allow both carbon and electronic transmission by the telephone connected to the telephone jack.

4. The headset bridging apparatus of claim 2 wherein the first switching means comprises a first and a second relay wherein the relays are double pole, double throw, with first and second connect positions, the first switching means further comprising a connection between the first and second relays operable to activate both relays when the first control signal is provided to the first control wiring, and wherein the second switching means comprises a double pole, double throw relay with first and second connect positions.

5. The headset bridging apparatus of claim 1 further comprises:
   (a) a recorder;
   (b) a terminal means for connecting external wiring;
   (c) a recorder jack, wherein the jack is a telephone type jack;
   (d) record wiring from the first switching means to the recorder jack and to the terminal means operable to allow the first switching means, based on the first control signal, to switch a pair of record wires from the recorder alternatively between a pair of record wires from the PSAP and a pair of terminal wires from the telephone, when a PSAP recorder output jack connector from the PSAP is connected to the recorder jack, and when the telephone and the recorder are connected to the terminal means.

6. The headset bridging apparatus of claim 5 wherein the first control signal is provided by the PSAP recorder output jack connector connected to the recorder jack, and by a connection to the terminal means.

7. The headset bridging apparatus of claim 1 which further comprises control wiring from the headset jack to the PSAP jack operable to allow PSAP log-off of an operator when the headset is disconnected from the headset jack.

* * * * *